United States Patent [19]

Nicholson

[11] Patent Number: 4,750,749
[45] Date of Patent: Jun. 14, 1988

[54] GASKETS

[76] Inventor: Terence P. Nicholson, Derwentside, England

[21] Appl. No.: 402,378

[22] Filed: Jul. 27, 1982

[30] Foreign Application Priority Data

Aug. 6, 1981 [GB] United Kingdom ............... 8124061

[51] Int. Cl.⁴ .............................................. F16J 15/12
[52] U.S. Cl. .................................... 277/211; 277/213; 277/234; 277/235 B
[58] Field of Search ..................... 277/211, 213, 235 B, 277/236, 234, 233

[56] References Cited

U.S. PATENT DOCUMENTS 3,167,320  1/1965  Kyle .................................... 277/211
4,196,913  4/1980  Oka ..................................... 277/236
4,214,444  7/1980  Fujioka et al. ................... 277/235 B

FOREIGN PATENT DOCUMENTS 384379  12/1932  United Kingdom ................ 277/213
2064677  6/1981  United Kingdom ................ 277/213

Primary Examiner—Allan N. Shoap
Attorney, Agent, or Firm—Murray Schaffer

[57] ABSTRACT

A cylinder head gasket for wet liner internal combustion engine comprises a pair of outer metal plates (1) and a central plate (2) made of stainless steel within a hardness range of 130–170 VPN of which the part surrounding each cylinder bore opening is formed with at least one circumferential corrugation (2a) which, in that region, increases the separation distance between the outer metal plates.

2 Claims, 2 Drawing Sheets

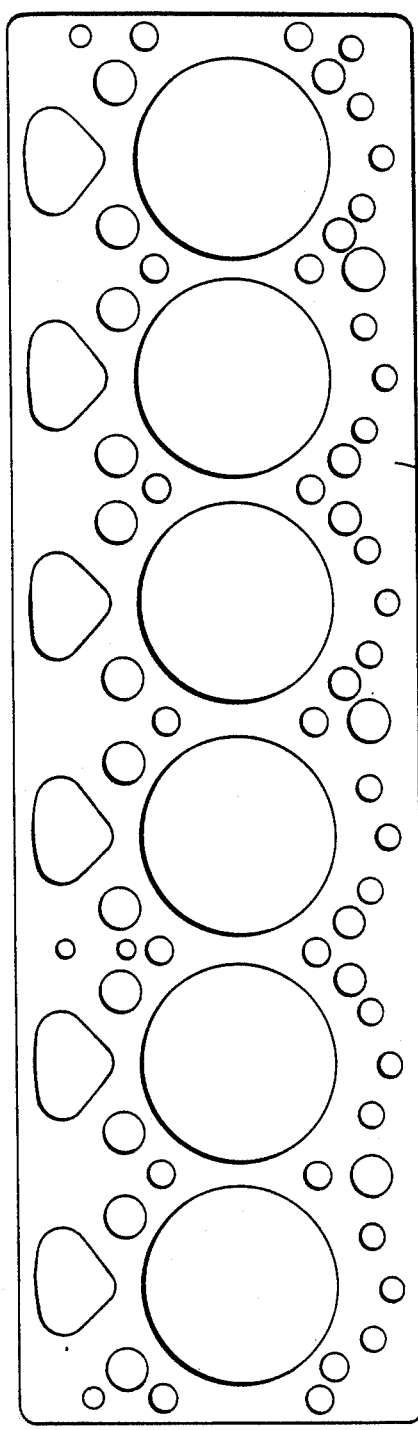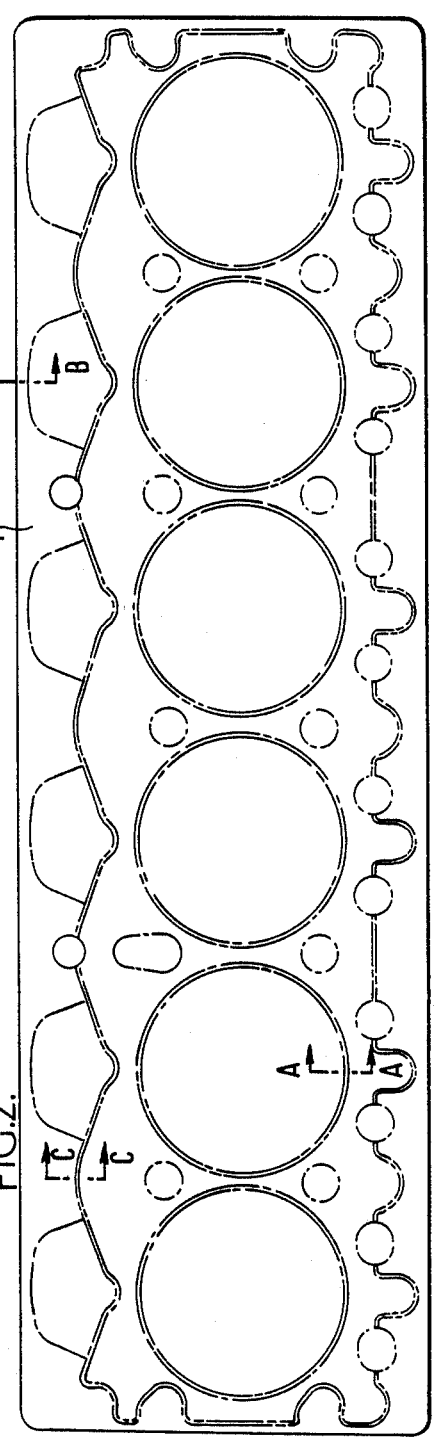

GASKETS

BACKGROUND OF THE INVENTION

This invention relates to a gasket particularly but not exclusively intended for sealing the joint between the cylinder block and the cylinder head of a dry liner internal combustion engine.

In my co-pending British Patent Application No. 7 940 625 and its corresponding U.S. Pat. No. 4,290,616 there has been proposed a gasket which comprises a pair of outer metal plates having outwardly directed corrugations formed therein and a central composite metal plate disposed between the two outer plates, the said central plate comprising a central soft metal layer and hard metal surface layers which are bonded or integral therewith. That gasket was characterised in that it incorporated around each cylinder bore opening a sealing washer formed on each axial face with circumferential serrations of V-shaped profile, the thickness of the washer measured over the peaks of the serrations being somewhat greater than that of the composite spacer plate whereas the thickness measured between the troughs of the serrations was significantly less than that of the spacer plate.

However in performing a test programme on certain engines equipped with these gaskets it was found that the quality of the metal necessary for sealing the water and oil apertures between the cylinder head and the cylinder block was unsatisfactory for the gas seal around the cylinder bores, the metal suffering very badly from thermal fatigue because of the ambient temperature pressure.

SUMMARY OF THE INVENTION

There has thus been developed in accordance with the present invention a cylinder head gasket for dry liner internal combustion engines comprising a pair of outer metal plates and a central plate made of half hard stainless steel—that is to say one within a hardness range of 130-170 VPN—of which the part surrounding each cylinder bore opening is formed with at least one circumferential corrugation which, in that region, increases the separation distance between the outer metal plates. Thus one or other of the outer plates in that region is of cranked formation.

BRIEF DESCRIPTION OF THE DRAWINGS

A particular and at present preferred embodiment of gasket in accordance with the invention is hereinafter described by reference to the accompanying drawings in which:

FIG. 1 is a plan view of a four cylinder engine cylinder block;

FIG. 2 is a plan view of a gasket for sealing the joint between the cylinder block of FIG. 1 and the cylinder head;

DESCRIPTION OF THE INVENTION

Figure 3:
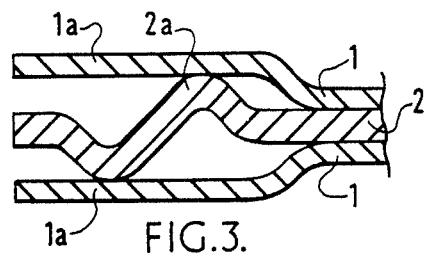
FIG. 3 is an enlarged section on line A—A of FIG. 2.

Referring now to the drawings the gasket which is shown in the drawings and hereinafter described is intended to seal the joint between the cylinder block and the cylinder head of a bank of four cylinders of a compression ignition wet liner engine. The main part of this gasket is constructed in substantial accordance with the disclosure of the aforementioned British Patent Application and its corresponding U.S. patent.

As shown most clearly in FIGS. 2, 3, 4 and 5 the gasket comprises two outer thin steel plates 0.012 inches in thickness to British standard specification 2920-1973. Between these plates is a central thicker plate 2 made of so called half hard stainless steel, i.e. within a hardness range of 130-170 VPN.

The outer plates 1 are formed with corrugated configurations of two different forms. The paths of these corrugations on the gasket are illustrated in chain-dashed lines in FIG. 2, the chain lines being drawn at the peaks or locus points of the lines of corrugation.

Figure 4:
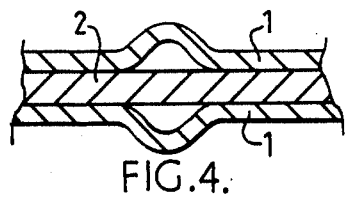
FIG. 4 is an enlarged section on line B—B of FIG. 2.

Referring to FIG. 2 in conjunction with FIG. 4, one form of corrugation is of single V-shaped profile, the single wave of which has an overall width of 0.063 inches and the corrugations are proud of the remainder of the outer plates by 0.018 inches.

Figure 5:
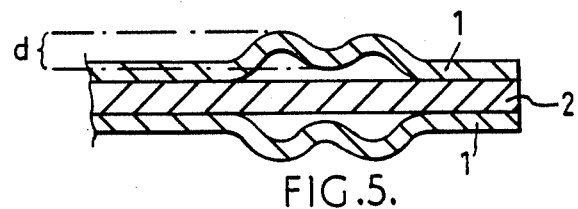
FIG. 5 is an enlarged section on line C—C of FIG. 2.

The other form of corrugation is shown in FIG. 5 in conjunction with FIG. 2 and is of double V-shaped profile. This double V-shape profile has the characteristic defined in my co-pending British Patent Application No. 4350/78 and corresponding U.S. Pat. No. 4,203,608 in that the distance d between a plane which contains the apices of the two waves and a plane parallel thereto which contains the base of the trough between the two waves is significantly less than the distance between the first plane and the base plane of the sheet. In the present instance the overall width of the two waves is 0.125 inches, the distance between the wave peaks is 0.063 inches and the distance d is 0.02 inches.

In order to understand how the gasket is equipped in order to ensure satisfactory gas tight sealing in the region of the four cylinder bores reference should now be made to FIG. 2 in conjunction with FIG. 3.

From FIG. 3 it can be seen that in the region of the cylinder bores the central plate 2 which is essentially thicker than the outer plates 1, has been formed with a double corrugation 2a with which cranked portions 1a of the outer plates are in engagement.

Figure 6:
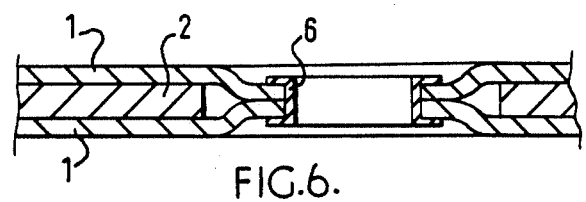
FIG. 6 is an enlarged section to illustrate the mode of securing the two outer plates and a central plate together.

FIG. 6 indicates the mode of securing central plate 2 between the outer plates 1 using hollow rivets 3 of which the number and positioning would be determined during manufacture of the prototype gasket.

A gasket constructed in the manner described above has been found to afford a perfect seal under all operating conditions of the engine in which it has been installed.

I claim:

1. A cylinder head gasket for wet liner internal combustion engines having openings therein registering with the corresponding cylinder bores comprising a pair of generally planar outer metal plates and a generally flat central plate made of stainless steel, said outer metal plates being secured to said central metal plate remote from said circumferential region, said central plate having a hardness within the range of 130-170 VPN and a uniform thickness over its entire area, each of said outer plates being bent outwardly from the plane thereof in the circumferential region of said bore openings so as to form annular portions spaced from each other a distance greater than the thickness of said central plate and having opposing surfaces facing each other, and said central plate being integrally formed with at least one annular corrugation in the circumferential region about each bore opening, said corrugation including a central leg portion traversing the space between said annular portion at an angle to the longitudinal axis of one of said openings, said central leg portion having each end thereof engaging a respective opposing face, and a pair of shorter leg portions each extending at an angle from a respective said end to a generally flat part of the central plate so as to increase the distance between the outer metal plates and resiliently maintain the outer metal plates separate.

2. A cylinder head gasket in accordance with claim 1 in which the central plate is thicker than the two outer plates.

* * * * *